(12) United States Patent
Sahashi et al.

(10) Patent No.: US 6,634,951 B2
(45) Date of Patent: Oct. 21, 2003

(54) DRIVING WHEEL BEARING UNIT

(75) Inventors: Koji Sahashi, Shizuoka-ken (JP); Kazuhiko Hozumi, Shizuoka-ken (JP); Keisuke Sone, Shizuoka-ken (JP); Hisashi Ohtsuki, Shizuoka-ken (JP); Ikuya Tateoka, Shizuoka-ken (JP); Masahiro Ozawa, Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 15 days.

(21) Appl. No.: 09/725,507

(22) Filed: Nov. 30, 2000

(65) Prior Publication Data

US 2001/0004611 A1 Jun. 21, 2001

(30) Foreign Application Priority Data

Dec. 15, 1999  (JP) ............................. 11-356431

(51) Int. Cl.[7] .............................. F16C 13/00; F16D 3/84
(52) U.S. Cl. ...................... 464/145; 384/544; 464/175
(58) Field of Search ................. 464/145, 906, 464/140, 175; 384/544

(56) References Cited

U.S. PATENT DOCUMENTS

| | | | | |
|---|---|---|---|---|
| 3,583,511 A | * | 6/1971 | Asberg ....................... 384/544 |
| 4,405,032 A | * | 9/1983 | Welschof et al. ........... 180/259 |
| 4,433,877 A | * | 2/1984 | Colanzi ...................... 308/191 |
| 4,571,099 A | * | 2/1986 | Balken et al. ............... 384/544 |
| 4,668,111 A | * | 5/1987 | Kapaan ....................... 384/544 |
| 4,986,607 A | * | 1/1991 | Hofmann et al. ........ 301/124 R |
| 5,607,241 A | * | 3/1997 | Fukumura ................... 384/544 |
| 5,931,738 A | * | 8/1999 | Robb .......................... 464/140 |
| 5,975,767 A | * | 11/1999 | Mizukoshi et al. ......... 384/544 |
| 6,146,022 A | * | 11/2000 | Sahashi et al. ............. 384/544 |
| 6,193,419 B1 | * | 2/2001 | Krude et al. ................ 384/544 |
| 6,280,338 B1 | * | 8/2001 | Hayama et al. ............. 464/146 |
| 6,318,533 B1 | * | 11/2001 | Krisher ..................... 192/69.41 |
| 6,478,309 B1 | * | 11/2002 | Miyamoto et al. .......... 277/634 |

* cited by examiner

*Primary Examiner*—Lynne H. Browne
*Assistant Examiner*—Kenneth Thompson
(74) *Attorney, Agent, or Firm*—Arent Fox Kintner Plotkin & Kahn, PLLC

(57) ABSTRACT

A driving wheel bearing unit is disclosed which facilitates works including mounting and dismounting to/from a car body. The driving wheel bearing unit is set to satisfy $Da \geq Db$, where Da is the diameter of its external member across a fitting surface thereof to be fitted to a mating member such as a knuckle, and Db is the maximum diameter of its constant velocity joint, so that a mounting bolt fixing the external member can be released to allow unitary extraction of the entire wheel bearing unit and the external member.

12 Claims, 10 Drawing Sheets

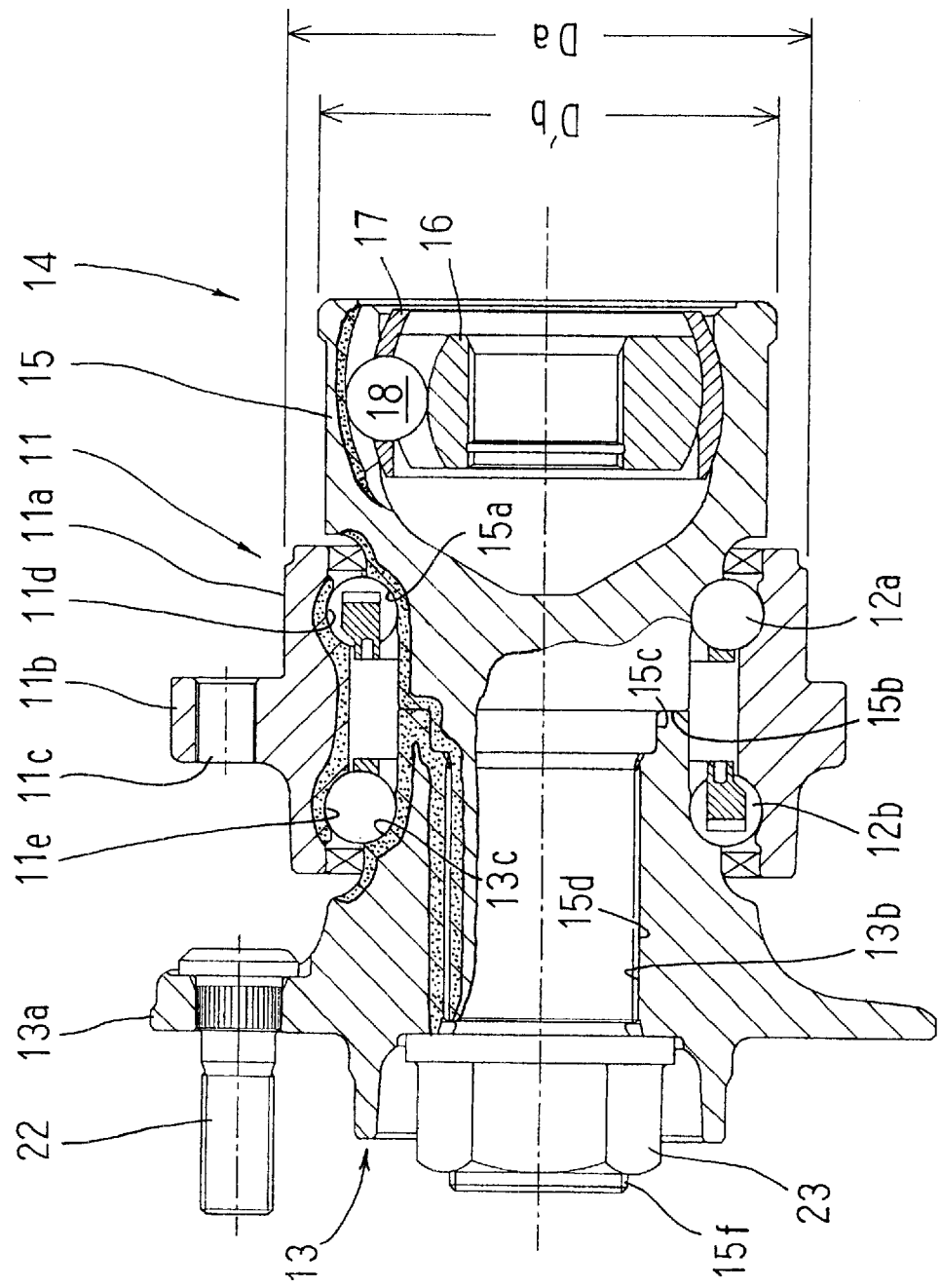

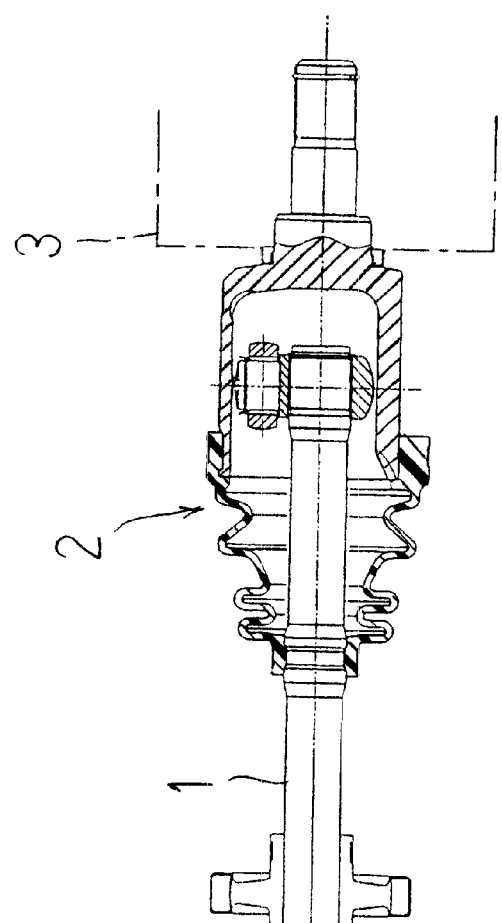
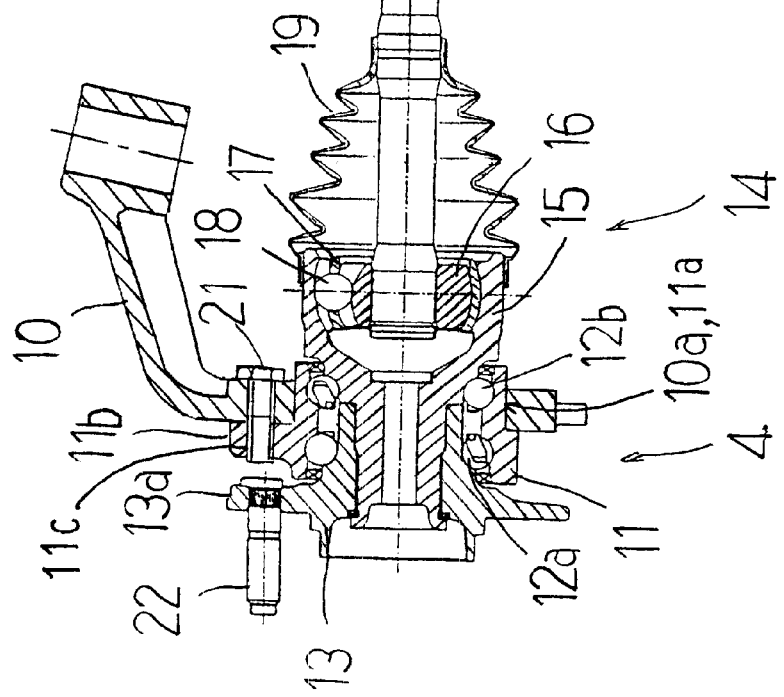
FIG.9

DRIVING WHEEL BEARING UNIT

BACKGROUND OF THE INVENTION

1. Field of the Invention

The present invention relates to a driving wheel bearing unit which comprises a drive train of a motor vehicle. In particular, the prevent invention relates to a driving wheel bearing unit in which a wheel bearing for supporting a driving wheel of a motor vehicle is integrated with a constant velocity joint that establishes coupling with a driving shaft for transmitting power to the driving wheel.

2. Description of the Related Art

As shown in FIGS. 9 and 10, this type of wheel bearing unit includes a driving shaft 1 which is coupled at its inner end to a differential 3 via a slide type constant velocity joint 2 and at its outer end to a wheel bearing 4 via a rigid type constant velocity joint 14. Here, the inner end of the driving shaft 1 refers to the end on the inside when viewed in the direction of width of a car body (the right sides in FIGS. 1–6, 9, and 10). Then, the outer end of the driving shaft 1 refers to the end on the outside when viewed in the direction of width of the car body (the left sides in FIGS. 1–6, 9, and 10). The wheel bearing 4 comprises an external member 11 and an internal member 13. The external member 11 is fixed to a knuckle 10 which is supported by the car body via a suspension system. The internal member 13 is rotatably supported inside the external member 11 via two rows of rolling elements 12a and 12b. An outside joint member 15 of the constant velocity joint 14 is coaxially coupled to and integrated with the internal member 13.

The knuckle 10 has a circular mounting hole 10a drilled therethrough in the car width direction. The external member 11 has a cylindrical outer periphery 11a at one end and a flange 11b at the other. The outer periphery 11a of the external member 11 is fitted to the mounting hole 10a in the knuckle 10. Then, mounting bolts 21 are inserted through bolt holes in the knuckle 10 from inside, and screwed into a plurality of screw holes 11c formed in the flange 11b. This fastens the knuckle 10 and the external member 11 to each other. Outer races 11d and 11e for the two rows of rolling elements 12a and 12b are formed in the inner periphery of the external member 11. Of two inner races corresponding to these outer races, one 13c is formed in the outer periphery of the internal member 13, and the other 15a is formed in the outer periphery of the outside joint member 15 of the constant velocity joint 14.

The constant velocity joint 14 is chiefly composed of the outside joint member 15, an inside joint member 16, a cage 17, a plurality of torque transmission balls 18, and a boot 19. The outside joint member 15 consists of a bowl-like mouth part and a shaft-like stem part. The mouth part has a spherical inner periphery provided with six guide grooves which extend along the axial direction at regular circumferential intervals. Formed on the stem part are a shoulder portion 15b extending perpendicularly to the axis, a press-in portion 15c having a cylindrical outer periphery, a spline shaft portion 15d, and a caulking portion 15e. These portions 15b–15e are arranged in series on the shaft-end side of the above-described inner race 15a. The inside joint member 16 has a spherical outer periphery provided with six guide grooves which extend along the axial direction at regular circumferential intervals. The outer end of the driving shaft 1 is spline-connected to this inside joint member 16. The guide grooves in the outside joint member 15 and the guide grooves in the inside joint member 16 are paired to form six ball tracks, in which six torque transmission balls 18 are arranged, i.e. one in each ball track, to make torque transmission between both the joint members. The cage 17 for retaining the torque transmission balls 18 is interposed between the inner periphery of the outside joint member 15 and the outer periphery of the inside joint member 16. The boot 19 of accordion form is fixed at its larger end to the outer periphery of the mouth part of the outside joint member 15. The smaller end of the boot 19 is fixed to the outer periphery of the driving shaft 1.

A flange 13a intended for wheel mounting is integrally formed on the outer periphery of the internal member 13. Hub bolts 22 are fixed to the flange 13a at a plurality of positions along the circumferential direction. The internal member 13 is shaped like a hollow cylinder, having a cylindrical hole portion and a spline hole portion 13b to be fitted to the outside joint member 15. The press-in portion 15c of the outside joint member 15 is pressed into the inner periphery of the internal member 13, and the spline shaft portion 15d of the outside joint member 15 is splineconnected to the spline hole portion 13b of the internal member 13. Then, with the shoulder portion 15b pressed against the inner end of the internal member 13, the caulking portion 15e is caulked with the outer end of the internal member 13 to integrate the internal member 13 and the outside joint member 15 with each other.

In the wheel bearing unit described above, the maximum outer diameter of the constant velocity joint 14, especially of the boot 19, is greater than the inner diameter of the mounting hole 10a in the knuckle 10. Accordingly, there has been a necessity to assemble the constant velocity joint 14 and the wheel bearing 4 on carmaker side, meaning poor workability. Besides, when the wheel bearing 4 and constant velocity joint 14 mounted on a car body are to undergo inspections, repairs, and the like, and when the constant velocity joint is to undergo boot replacement in particular, it has been needed that the entire unit including the knuckle 10 be dismounted from the car body, resulting in poor workability.

SUMMARY OF THE INVENTION

An object of the present invention is to facilitate the disassembly, assembly, and other works on a driving wheel bearing unit.

The present invention has solved the foregoing problem by rendering the diameter of the constant velocity joint across its maximum diameter portion equal to or smaller than the diameter of the external member across the fitting surface thereof.

In general, the maximum outer diameter portion of a boot attached to the outer periphery of the outside joint member makes the maximum diameter portion of the constant velocity joint. Therefore, when the diameter of this boot's maximum outer diameter portion is set to be equal to or smaller than the diameter of the external member across the fitting surface, it becomes possible to pass the entire constant velocity joint through a mating member to be fitted to the fitting surface of the external member, i.e., the mounting hole in the knuckle.

According to the present invention, it becomes possible to mount a wheel bearing and a constant velocity joint to a knuckle after assembly, with an improvement in workability. For example, when the wheel bearing and the constant velocity joint are mounted to a car body, their preassembly can be inserted from outside the car body to a mounting hole in the knuckle for mounting. When they are dismounted from the car body, the fastening between the external member and the knuckle can be released to allow the unitary extraction of the wheel bearing and the constant velocity joint from the mounting hole in the knuckle. This facilitates works including inspections and repairs.

More specifically, a driving wheel bearing unit is provided comprising: a wheel bearing including an external member having an outer periphery provided with a mounting flange for car-body mounting and a fitting surface, and an inner periphery provided with two outer races, and an internal member rotatably arranged inside the external member via a rolling element, the internal member having an outer periphery provided with a race and a wheel mounting flange for mounting a wheel; and a constant velocity joint to be arranged on one end of a driving shaft, the constant velocity joint including an outside joint member having an inner periphery provided with eight guide grooves, an inside joint member having an outer periphery provided with eight guide grooves, eight torque transmission balls individually arranged in eight ball tracks formed by pairs of the guide grooves in the outside joint member and the guide grooves in the inside joint member, a cage for retaining the torque transmission balls, and a boot to be attached to the outside joint member; the wheel bearing and the outside joint member of the constant velocity joint being integrated with each other. Here, the diameter of the boot across its maximum diameter portion is made equal to or smaller than the diameter of the external member across the fitting surface.

Alternatively, in the cases of using a boot apt to elastic deformation such as a rubber boot, the boot can be passed through the mounting hole in the knuckle as deformed elastically. Therefore, it is required only that the maximum diameter portion of the outside joint member have such a diameter as to pass through the mounting hole in the knuckle. Thus, the maximum diameter portion of the outside joint member is sometimes regarded as the maximum diameter portion of the constant velocity joint.

More specifically, a driving wheel bearing unit is provided comprising: a wheel bearing including an external member having an outer periphery provided with a mounting flange for car-body mounting and a fitting surface, and an inner periphery provided with two outer races, and an internal member rotatably arranged inside the external member via a rolling element, the internal member having an outer periphery provided with a race and a wheel mounting flange for mounting a wheel; and a constant velocity joint to be arranged on one end of a driving shaft, the constant velocity joint including an outside joint member having an inner periphery provided with eight guide grooves, an inside joint member having an outer periphery provided with eight guide grooves, eight torque transmission balls individually arranged in eight ball tracks formed by pairs of the guide grooves in the outside joint member and the guide grooves in the inside joint member, a cage for retaining the torque transmission balls, and a boot to be attached to the outside joint member; the wheel bearing and the outside joint member of the constant velocity joint being integrated with each other. Here, the diameter of the outside joint member across its maximum diameter portion is made equal to or smaller than the diameter of the external member across the fitting surface A constant velocity joint using eight torque transmission balls may have an outside joint member of smaller outer diameter as compared with a conventional constant velocity joint with six balls. Therefore, in rendering the maximum diameter portion of the constant velocity joint equal to or smaller than the fitting surface of the external member in diameter, optimum design can be made without affecting other specifications such as the strength of the constant velocity joint.

The wheel bearing, the constant velocity joint to be arranged on the one end of the driving shaft, the driving shaft, and a constant velocity joint to be arranged on the other end of the driving shaft may constitute a drive shaft assembly in which and the maximum outer diameter of the drive shaft assembly is made equal to or smaller than the diameter of the external member across the fitting surface.

One of two inner races corresponding to the two outer races on the external member may be arranged in the outer periphery of the internal member, and the other in the outer periphery of the outside joint member.

The internal member of the wheel bearing and the outside joint member of the constant velocity joint may be integrated with each other by staking. Here, fastening with a nut may also be adopted as the means for connecting the two parts. Nevertheless, the integration by staking makes separation difficult, and hence maximizes the advantage of the present invention that the entire wheel bearing unit can be mounted on and dismounted from the knuckle in the form of an assembly.

The constant velocity joint to be arranged on the other end of the driving shaft may comprise: an outside joint member having a cylindrical inside surface provided with eight linear guide grooves extending axially; an inside joint member having a spherical outside surface provided with eight linear guide grooves extending axially; eight torque transmission balls individually arranged in eight ball tracks formed by pairs of the guide grooves in the outside joint member and the guide grooves in the inside joint member; and a cage for retaining the torque transmission balls.

The boot may be made of resin material.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 6 is a longitudinal sectional view showing the essential parts of the driving wheel bearing unit in FIG. 5;

FIG. 9 is a longitudinal sectional view of a conventional driving wheel bearing unit.

DETAILED DESCRIPTION OF THE PREFERRED EMBODIMENTS

Hereinafter, embodiments of the present invention will be described with reference to the drawings.

Figure 1:
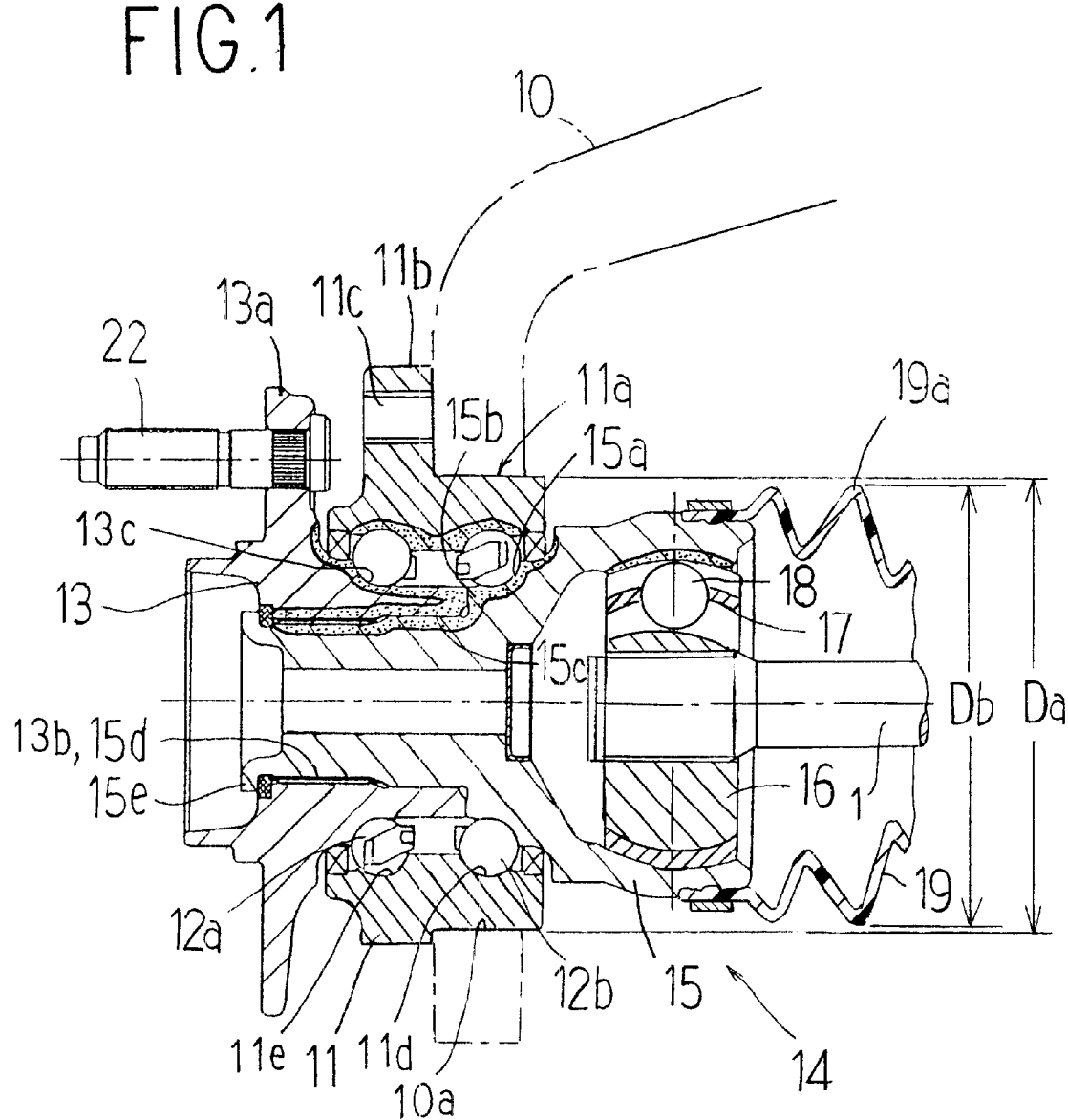
FIG. 1 is a longitudinal sectional view showing the essential parts of a driving wheel bearing unit.
Figure 2:
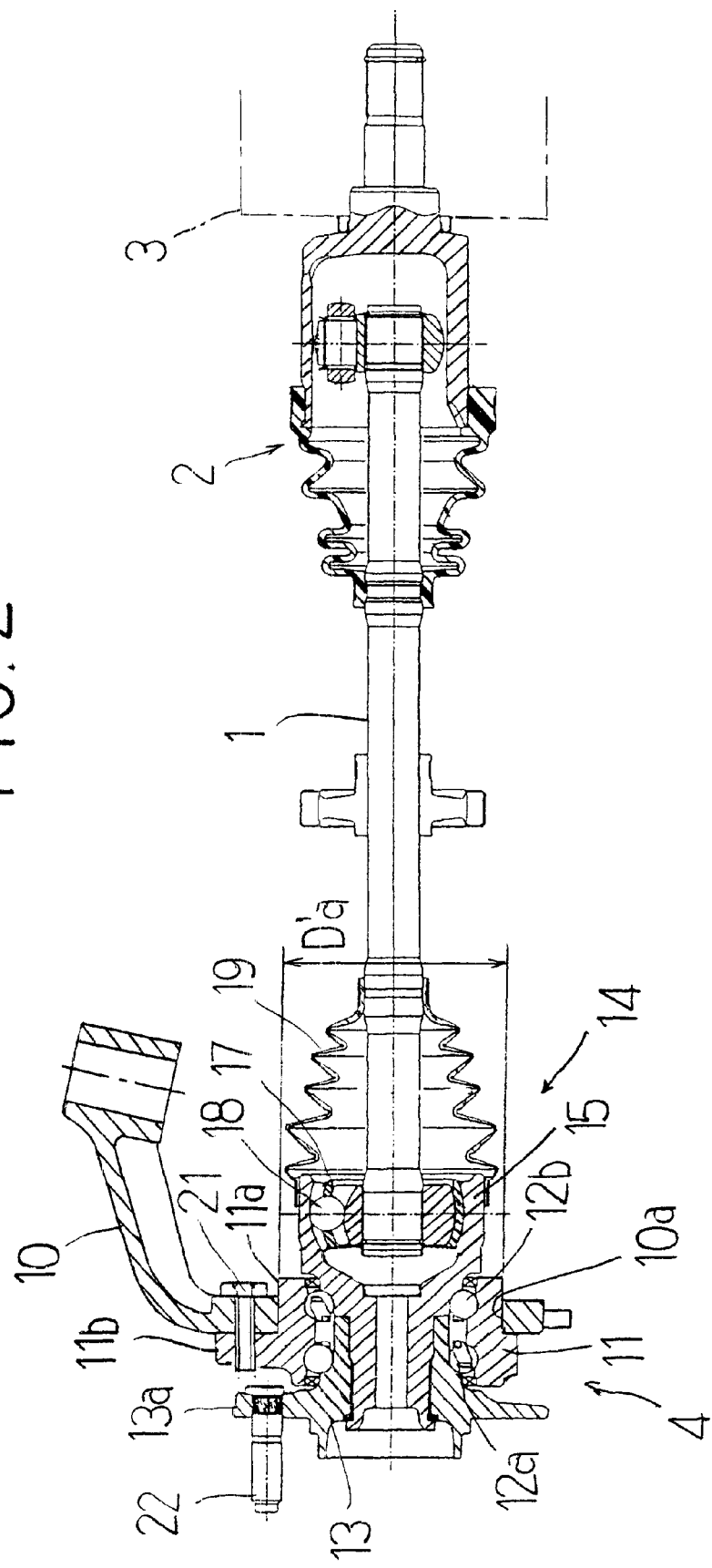
FIG. 2 is a longitudinal sectional view of the driving wheel bearing unit and a drive shaft.
Figure 3:
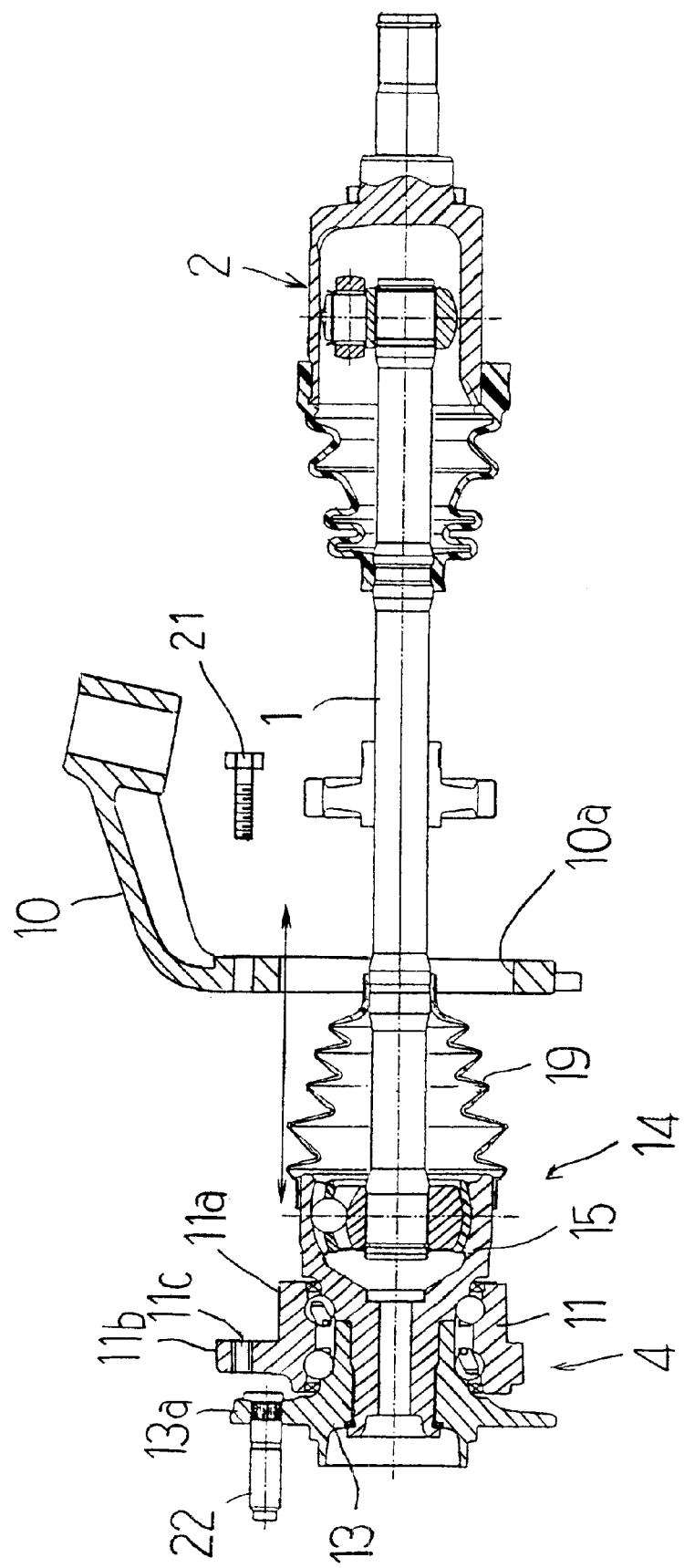
FIG. 3 is a longitudinal sectional view of the same detached from the knuckle.

Initially, description will be given of the embodiment shown in FIGS. 1–3. Here, as far as the basic structure is concerned, the embodiment in FIGS. 1–3 is identical to the above-described unit in FIGS. 9 and 10. Therefore, substantially the same elements or parts as those described previously in conjunction with FIGS. 9 and 10 will be designated by identical reference numerals, and repetitive description thereof will be omitted.

Figure 10:
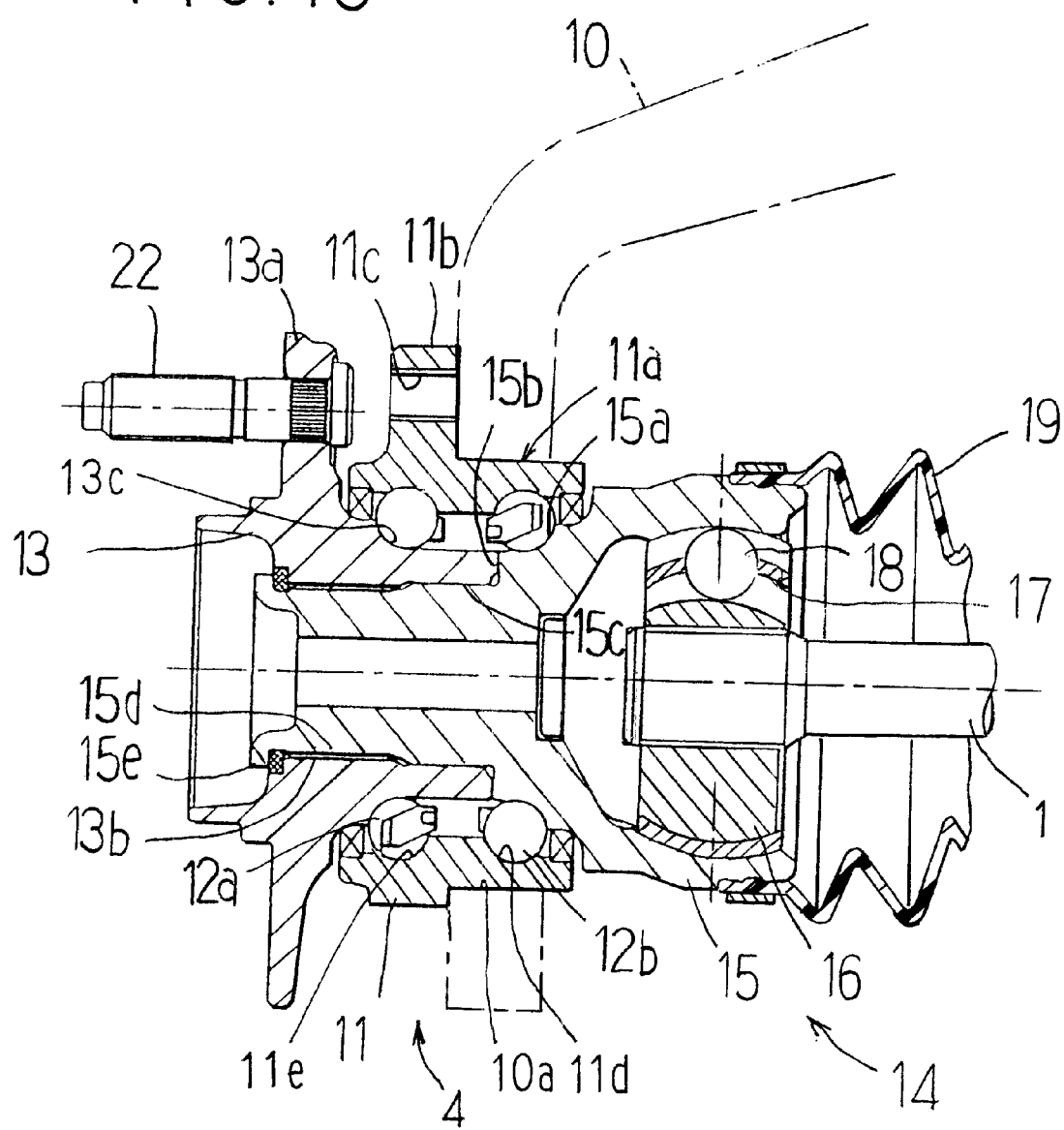
FIG. 10 is a partially enlarged view of FIG. 9.

As seen from comparisons with FIGS. 10 and 9, the driving wheel bearing unit shown in FIGS. 1 and 2 is characterized in the setting of $Da \geq Db$, where Da is the diameter of the external member 11 across its fitting surface 11a to be fitted to the mounting hole 10a in the knuckle 10, and Db is the diameter of the constant velocity joint 14 across its maximum diameter portion. Here holds the relationship $D'a \geq Da \geq Db$, where D'a is the inner diameter of the mounting hole 10a in the knuckle 10. The relationship $D'a \geq Da$ should be designed on the basis of ordinary fits.

The larger end of the boot 19 is fixed to the outer periphery of the outside joint member 15, and therefore a maximum diameter portion 19a of the boot 19 usually makes the maximum diameter portion of the constant velocity joint. Since the inner diameter Da of the mounting hole 10a in the knuckle 10 is greater than this maximum diameter portion 19a, the wheel bearing 4 and the constant velocity joint 14 can be assembled before the external member 11 is mounted onto the knuckle 10. The assembly consisting of the driving shaft 1 and the constant velocity joints 2, 14 on both sides is sometimes referred to as drive shaft. When the maximum outer diameter of such a drive shaft is rendered smaller than the diameter Da of the external member 11 across the fitting surface 11a, it becomes possible for the entire drive shaft to be inserted and extracted through the mounting hole 10a in the knuckle 10.

More specifically, as shown in FIG. 3, the bearing unit is mounted onto the knuckle 10 fixed to a car body (not shown) in the following way. The wheel bearing 4, the constant velocity joint 14, the driving shaft 1, and the constant velocity joint 2 are assembled in advance as shown in the diagram. In this state, they are successively passed through the mounting hole 10a in the knuckle 10, from the left to right in the diagram, with the constant velocity joint 2 ahead. Finally, the fitting surface 11a of the external member 11 is fit to the mounting hole 10a in the knuckle 10, and the flange 11b of the external member 11 is fastened to the knuckle 10 with the mounting bolts 21. Such insertion of the entire bearing unit to the mounting hole 10a is allowed by the above-described dimensional relationship $D'a \geq Da \geq Db$. This also permits the entire bearing unit to be assembled at a location away from the car body, with enhanced workability and improved assembly precision.

To dismount the bearing unit from the car body, the mounting bolts 21 fastening the knuckle 10 and the external member 11 to each other are removed. The entire bearing unit is extracted out of the car body, i.e., passed through the mounting hole 10a in the knuckle 10 from the right to left in the diagram. The bearing unit is transported to a different site from the car body. Then, component parts in need of repair or inspection are exclusively disassembled from the bearing unit transported to the different site, and only the disassembled parts are reassembled after repair. By so doing, the disassembly and repair of the bearing unit, the boot replacement of the constant velocity joint, and the like are efficiently performed with minimum man-hour. In this case, even a boot 19 made of high-hardness material such as resin is applicable.

In favor of bearing rolling life, rigidity, fretting resistance, and the like, the wheel bearing 4 is generally used with a negative bearing axial clearance, i.e., under a given preload. This negative bearing axial clearance is measured, for example, in the following way. That is, the outside joint member 15 is pressed into the internal member 13 until the shoulder portion 15b and the inner end face of the internal member 13 come into a desired space S, and then the pressing is suspended. Here, a bearing axial clearance $\ddot{A}a'$ is measured from this positive bearing axial clearance S and the maximum axial displacement of the external member 11. Next, the outside joint member 15 is pressed in until its shoulder portion 15b makes contact with the inner end face of the internal member 13, and a negative bearing axial clearance $\ddot{A}a$ is determined by the equation $\ddot{A}a = \ddot{A}a' - S$.

Figure 4:
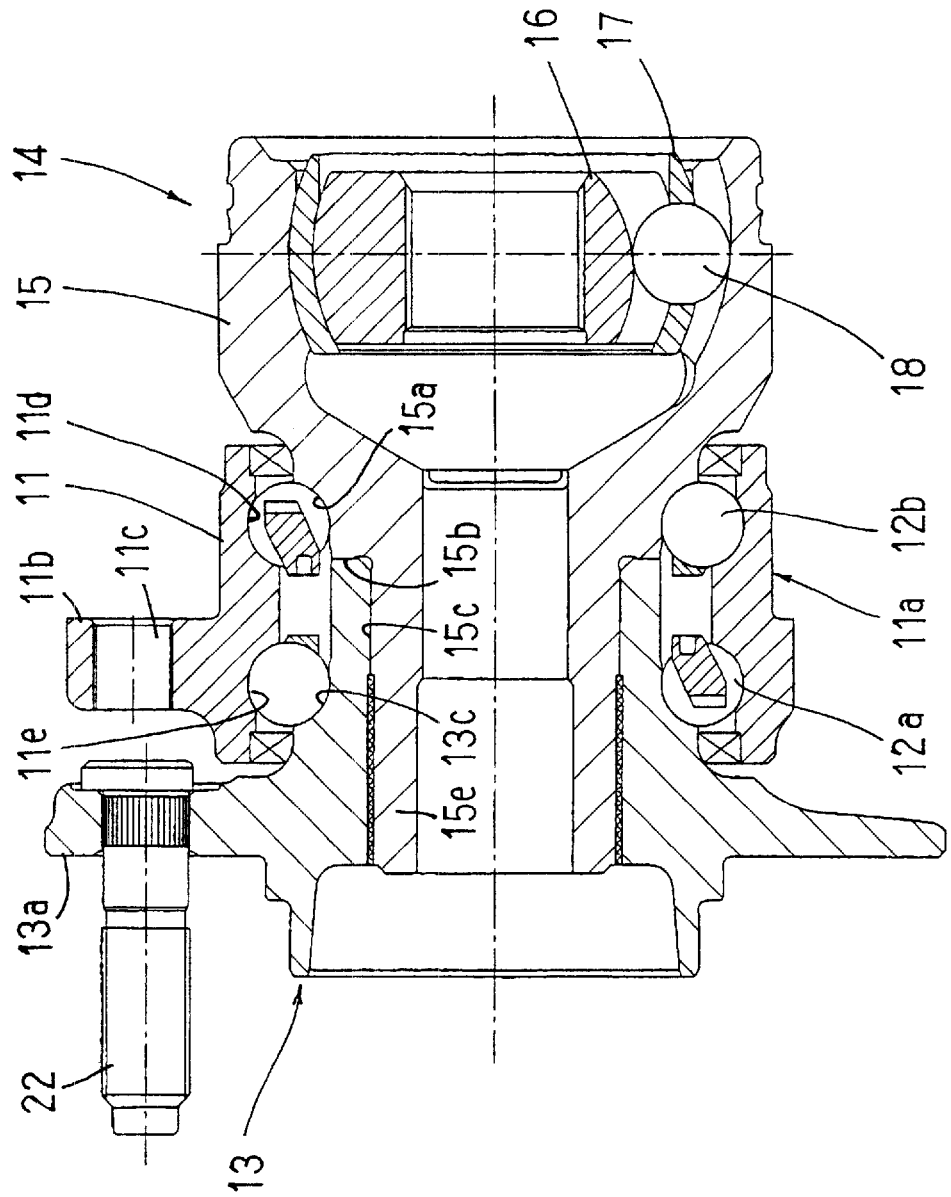
FIG. 4 is a longitudinal sectional view showing the essential parts of a driving wheel bearing unit.

In the embodiment of FIGS. 1–3, as in FIGS. 9 and 10, the press-in portion 15c of the outside joint member 15 is pressed into the inner periphery of the internal member 13, and the spline shaft portion 15d of the outside joint member 15 is spline-connected to the spline hole portion 13b of the internal member 13. Then, with the shoulder portion 15b pressed against the inner end of the internal member 13, a shaft endportion 15e is staked against the outer end of the internal member 13 to integrate the internal member 13 and the outside joint member 15 with each other. Here, staking or coining as shown in FIG. 4 may be adopted instead. That is, a shaft end portion of the outside joint member 15, pressed into the internal member 13 is expanded in diameter from the inner-diameter side toward the outer-diameter side to cause plastic connecting (coining) therebetween. In FIGS. 1 and 4, the reference numerals 15e represent the staked portions.

The outside joint member 15 is formed of carbon steel having a carbon content of 0.45–1.10% by weight, and is made with a hardness of Hv 200–300 at least in the end portion (the caulking portion 15e before being worked). This secures the hardness required of the inboard-side inner race 15a and the track grooves in the mouth part (Hv 510–900), and allows satisfactory staking as well. More specifically, if the end portion in advance of forming the staked portion 15e exceeds Hv 300 in hardness, the staking of the end portion can produce a crack in the staked portion 15e, or result in insufficient staking so that the staked portion 15e and the internal member 13 lose their tight contact to fall short of connecting force between the internal member 13 and the outside joint member 15. Moreover, the formation of the staked portion 15e might require an excessive load so that the staking causes damages such as indentations to the inner race 13c and the rolling elements 12a and produces the possibility of deteriorating the individual parts in dimensional accuracy. The reason for this is that when the carbon steel forming the outside joint member 15 exceeds 1.10% in carbon content, it becomes difficult to suppress the end portion in advance of forming the staked portion 15e to or below Hv 300 in hardness. On the contrary, when the hardness of the end portion is below Hv 200, it is impossible to ensure the hardness of the staked portion 15e, and the staked portion falls short of the connecting force again. When the carbon steel forming the outside joint member 15 is below 0.45% by weight in carbon content, it is impossible to ensure the hardness required of the inboard-side inner race 15a (Hv 510–900), which shortens the life of the inner race part. The end portion of the stem part (the portion 15e before being staked) requires ductility since it is intended for staking. Accordingly, in order to allow this staking, the end portion is subjected to no quenching, being left as an unquenched portion. In the upper half of FIG. 1 above the center line, quench-hardened layers are shown in satiny textures.

The outside joint member 15 thus has the inboard-side inner race 15a hardened by quenching, so that this inner race can secure a sufficient rolling fatigue life. On the other hand, the end portion is subjected to no quenching and left intact. This avoids an excessive force being required for the plastic deformation of the end portion, and precludes the plastic deformation of the end portion from facilitating the production of damages such as cracks in the end portion (the staked portion 15e). Therefore, even in the cases where the inboard-side inner race 15a is enhanced in hardness for the sake of the rolling fatigue life, the staked portion for connecting the outside joint member 15 and the internal member 13 requires no complicated work. Furthermore, the internal member 13 has a hardened layer formed over the entire inner periphery thereof. Accordingly, even if the staking imposes a large load on the internal member 13, deformation of the internal member 13 is prevented to preclude the bearing internal clearances deviating from desired values. Additionally, the outboard-side inner race 13c formed in the outer periphery of the internal member 13 can be prevented from changing in diameter or deteriorating in precision, so that this inner race 13c is prevented from a drop in rolling fatigue life.

Figure 5:
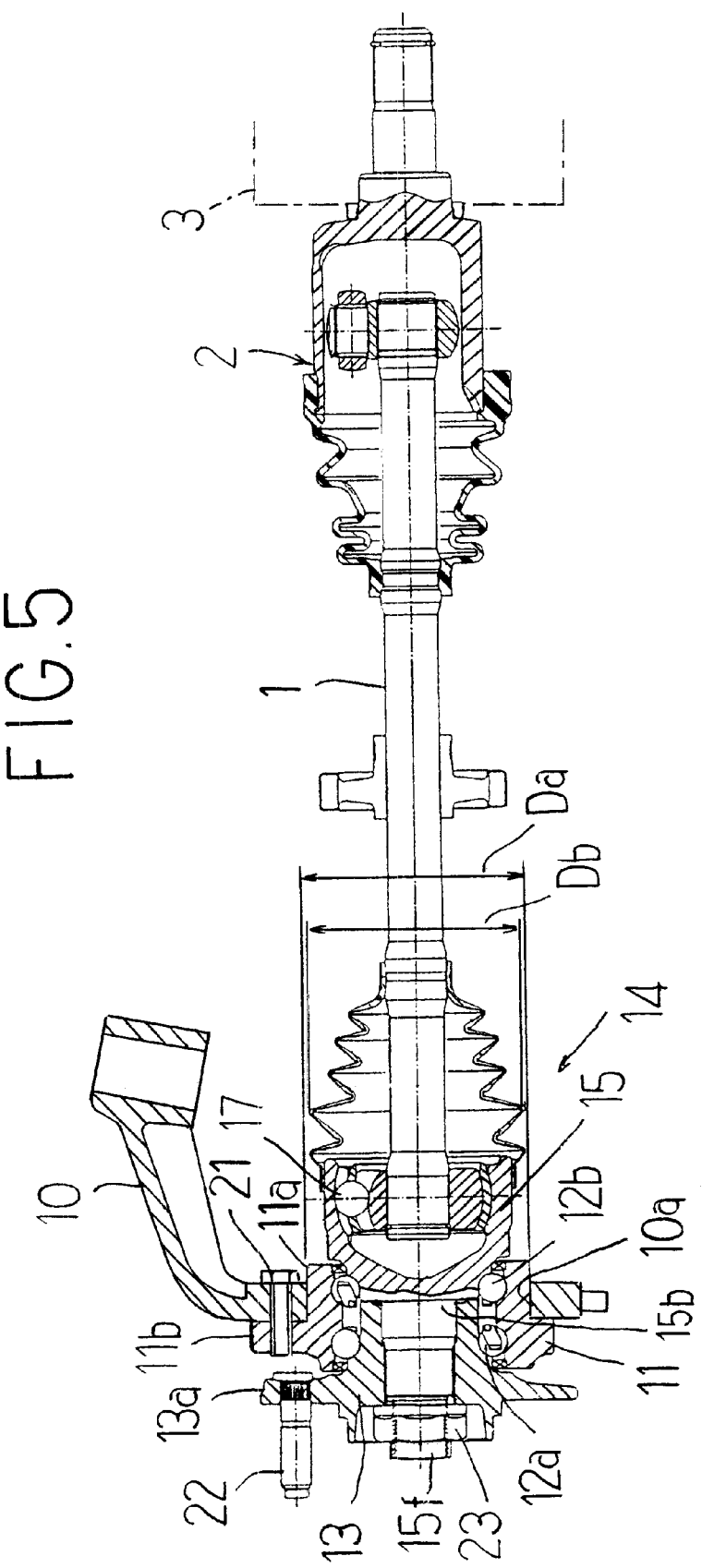
FIG. 5 is a longitudinal sectional view of a driving wheel bearing unit and a drive shaft.

As for the means to connect the internal member 13 and the outside member 15 to each other, the fastening with a nut 23 as shown in FIG. 5 may be adopted instead of the staking described above. In that case, the stem part of the outside joint member 15 is pressed into the internal member 13, and, with the shoulder portion 15b pressed against the inner end face of the internal member 13, the nut 23 is tightened to a screw shaft portion 15f which is formed on the extremity of the stem part of the outside joint member 15.

FIG. 6 shows under magnification the essential parts of the embodiment in FIG. 5, with the inside joint member 16 separated from the driving shaft 1 and the boot 19 detached. In the upper half of FIG. 6 above the center line, the satiny textures represent quench-hardened layers. As shown in the diagram, the outside joint member 15 has a maximum outer diameter D'b smaller than the diameter Da of the external member 11 across the fitting surface 11a (Da>D'b). As long as such a dimensional relationship is ensured, the external member 11 can be released from the fastening with the knuckle 10 to allow unitary dismounting of the wheel bearing 4 and the constant velocity joint 14 shown in FIG. 6 from the knuckle 10, for the fitting surface 11a of the external member 11 is the surface to be fitted to the mounting hole 10a in the knuckle 10. While the driving shaft 1 here is shown as detached, it is also possible to extract or insert the entire drive shaft assembly including up to the slide type constant velocity joint 2 on the differential side from or to the mounting hole 10 in the knuckle 10, with the inside joint member 16 and the driving shaft 1 left coupled to each other. Incidentally, the boot 19 to be fixed to the periphery of the outside joint member 15 at its larger end may sometimes have the maximum diameter portion that is greater than the diameter of the external member 11 across the fitting surface 11a. In such cases, the boot 19 can be made of material having some flexibility, such as rubber, so that it is passed through the through hole 10a in the knuckle 10 as deformed elastically.

Figure 7A:
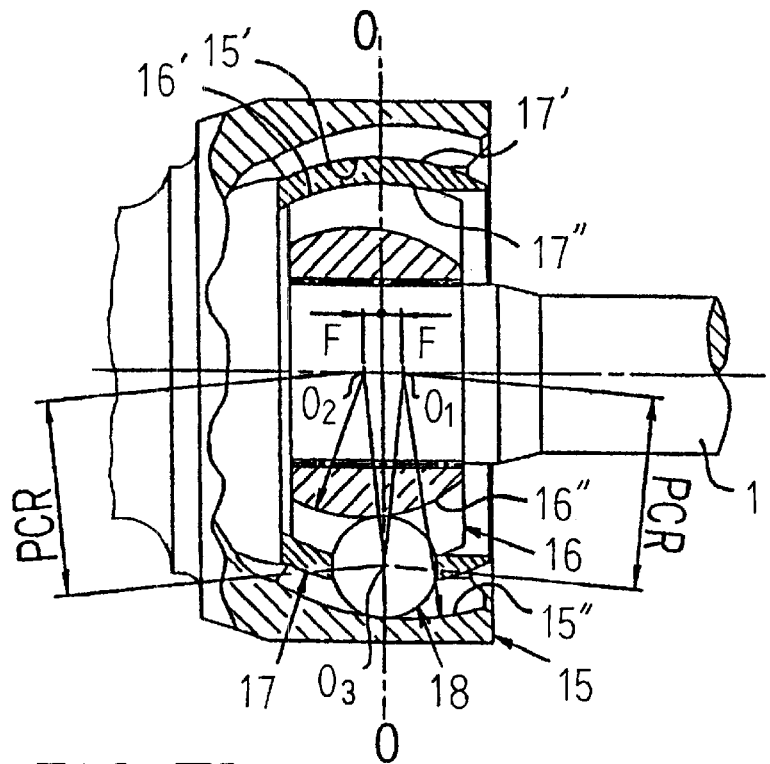
FIGS. 7A and 7B are a longitudinal sectional view and a cross sectional view of a rigid type constant velocity joint, respectively.
Figure 7B:
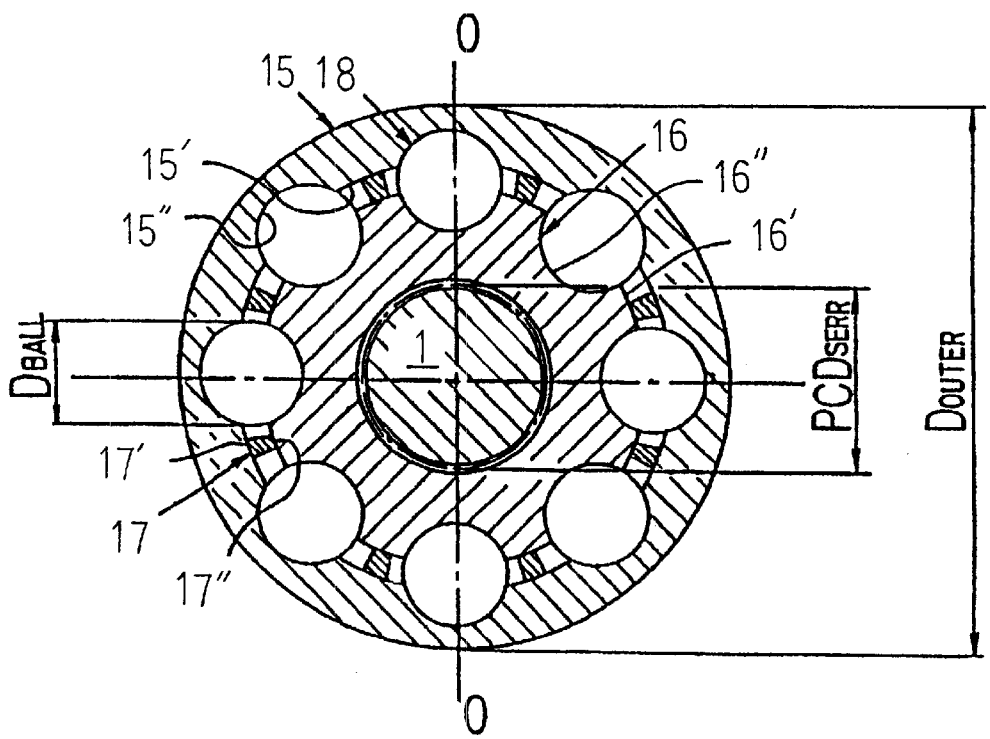

One end of the driving shaft 1 is coupled to the wheel bearing 4 through the fixed constant velocity joint 14. The other end of the driving shaft 1 is coupled to the differential (final reduction gears) 3 through the slide type constant velocity joint 2. FIGS. 7A and 7B show a concrete example of the fixed constant velocity joint 14. This fixed constant velocity joint is a Zeppa type constant velocity joint (Birfield type fixed constant velocity joint), and comprises an outside joint member 15, an inside joint member 16, eight torque transmission balls 18, and a cage 17. The outside joint member 15 has a spherical inside surface 15' provided with eight curved guide grooves 15" formed axially. The inside joint member 16 has a spherical outside surface 16' provided with eight curved guide grooves 16" formed axially, and an inside surface provided with a serration or spline tooth profile. The eight torque transmission balls 18 are individually arranged in eight ball tracks which are formed by the corresponding pairs of guide grooves 15" and 16" in the outside and inside joint members 15 and 16. The cage 17 retains the torque transmission balls 18. The one end of the driving shaft 1 is serration- or spline-connected to the serration or spline hole in the inside joint member 16.

The center $O_1$ of the guide grooves 15" in the outside joint member 15 and the center $O_2$ of the guide grooves 16" in the inside joint member 16 have offsets from the spherical center of the inside surface 15' and the spherical center of the outside surface 16', respectively, by equal axial distances (F) in the opposite directions (the center $O_1$ to the opening side of the joint, the center $O_2$ to the bottom side of the joint). Accordingly, the ball tracks formed between the pairs of guide grooves 15" and 16" have the shape of a wedge widening toward the opening side of the joint.

An outside surface 17' of the cage 17 and the inside surface 15' of the outside joint member 15, serving as a guide surface for the outside surface 17' of the cage 17, both have their spherical centers falling on a joint center plane O which includes the centers $O_3$ of the torque transmission balls 18. Moreover, an inside surface 17" of the cage 17 and the outside surface 16' of the inside joint member 16, serving as a guide surface for the inside surface 17" of the cage 17, both have their spherical centers falling on the joint center plane O. Thus, the above-mentioned offset (F) of the outside joint member 15 is the axial distance between the center $O_1$ of the guide grooves 15" and the joint center plane O, and the above-mentioned offset (F) of the inside joint member 16 is the axial distance between the center $O_2$ of the guide grooves 16" and the joint center plane O, the two offsets being equal to each other. The center $O_1$ of the guide grooves 15" in the outside joint member 15 and the center $O_2$ of the guide grooves 16" in the inside joint member 16 are off the joint center plane O by the equal axial distances (F) to the opposite sides (the center $O_1$ to the opening side of the joint, the center $O_2$ to the bottom side of the joint).

When the outside joint member 15 and the inside joint member 16 make an angular displacement of è, the torque transmission balls 18 guided by the cage 17 are maintained on the bisector plane of the angle è (i.e., at è/2), ensuring the uniformity in the joint velocity at any operating angle of è.

The torque transmission balls 18 may be configured so that their pitch circle diameter ($PCD_{BALL}$) and their diameter ($D_{BALL}$) have a ratio ($r_1 = PCD_{BALL}/D_{BALL}$) in the range of $3.3 \leq r_1 \leq 5.0$. Here, the pitch circle diameter of torque transmission balls ($PCD_{BALL}$) refers to a dimension twice PCR of the same ($PCD_{BALL} = 2 \times PCR$). Both the length of the line segment connecting the center $O_1$ of the guide grooves 15" in the outside joint member 15 to the center $O_3$ of a torque transmission ball 18 and the length of the line segment connecting the center $O_2$ of the guide grooves 16" in the inside joint member 16 to the center $O_3$ of a torque transmission ball 18 are PCRs. The two PCRs are equal to each other.

The ratio $r_1$ is set within the range of $3.3 \leq r_1 \leq 5.0$ in order to ensure that the strengths of the outside joint member and the like, as well as the load capacity and durability of the joint, are equivalent to or higher than those of a rigid type constant velocity joint with six balls. More specifically, a constant velocity joint has difficulties in making considerable changes to the pitch circle diameter of torque transmission balls ($PCD_{BALL}$) within its limited spaces. Therefore, the ratio $r_1$ chiefly depends on the diameter of the torque transmission balls ($D_{BALL}$). If $r_1<3.3$, the remaining parts (the outside joint member, the inside joint member, and the like) become so thin as to grow concerns in strength. In contrast, when $r_1>5.0$ (mainly in the cases where the diameter $D_{BALL}$ is smaller), the load capacity decreases to arouse concerns in durability. Besides, contacting portions between the torque transmission balls and the guide grooves rise in surface pressure (since smaller diameters $D_{BALL}$ make smaller contact ellipses on the contacting portions), possibly contributing to chips and the like on groove shoulder edges of the guide grooves. The setting of $3.3 \leq r_1 \leq 5.0$ allows the outside joint member and the like to secure strength, and the joint to secure load capacity and durability, equivalent to or higher than those of a rigid type constant velocity joint with six balls. The ratio $r_1$ is more favorably set within the range of $3.5 \leq r_1 \leq 5.0$; for example, $r_1=3.83$ or a close value.

The outer diameter ($D_{OUTER}$) of the outside joint member 15 and the pitch circle diameter ($PCD_{SERR}$) of the serration or spline tooth profile of the inside joint member 16 may have a ratio ($r_2=D_{OUTER}/PCD_{SERR}$) set within the range of $2.5 \leq r_2 \leq 3.5$. The reason for setting the ratio $r_2$ in the range of $2.5 \leq r_2 \leq 3.5$ consists in the following. That is, the pitch circle diameter ($PCD_{SERR}$) of the tooth profile of the inside joint member 16 is not susceptible to considerable changes in relation to the strength and the like of the driving shaft 1. Therefore, $r_2$ chiefly depends on the outer diameter ($D_{OUTER}$) of the outside joint member 15. If $r_2<2.5$ (mainly because of smaller outer diameters $D_{OUTER}$), the individual parts (the outside joint member, the inside joint member, and the like) become so thin as to grow concerns in strength. In contrast, when $r_2>3.5$ (mainly because of greater outer diameters $D_{OUTER}$), dimensional and other aspects sometimes cause a problem in practicability, and the objective of compactization cannot be achieved. The setting of $2.5 \leq r_2 \leq 3.5$ allows the outside joint member and the like to secure strength, and the joint to secure durability, equivalent to or higher than those of a six-balled constant velocity joint, and satisfies practical requirements as well. The setting of $2.5 \leq r_2 < 3.2$ is preferable.

In this constant velocity joint having the eight torque transmission balls 18, a load per torque transmission ball forms a smaller proportion of the total load capacity of the joint when compared with conventional rigid type constant velocity joints having six balls. Therefore, the torque transmission balls 18 can be reduced in diameter ($D_{BALL}$) to secure the thicknesses of the outside joint member 15 and the inside joint member 16 as in a six-balled rigid type constant velocity joint. In addition, while the ratio $r_2$ in a six-balled rigid type constant velocity joint typically has a value of $r_2 \geq 3.2$, this ratio $r_2$ ($=D_{OUTER}/PCD_{SERR}$) can be lowered to secure equivalent or higher strength, load capacity, and durability as well as achieve further compactization in outer dimension ($D_{OUTER}$). Moreover, it has been confirmed from experiments that this constant velocity joint generates less heat as compared with a six-balled rigid type constant velocity joint. Incidentally, while this embodiment has dealt with eight pairs of guide grooves 25" and 26", the same effects can be obtained from any number of pairs no less than eight.

Figure 8A:
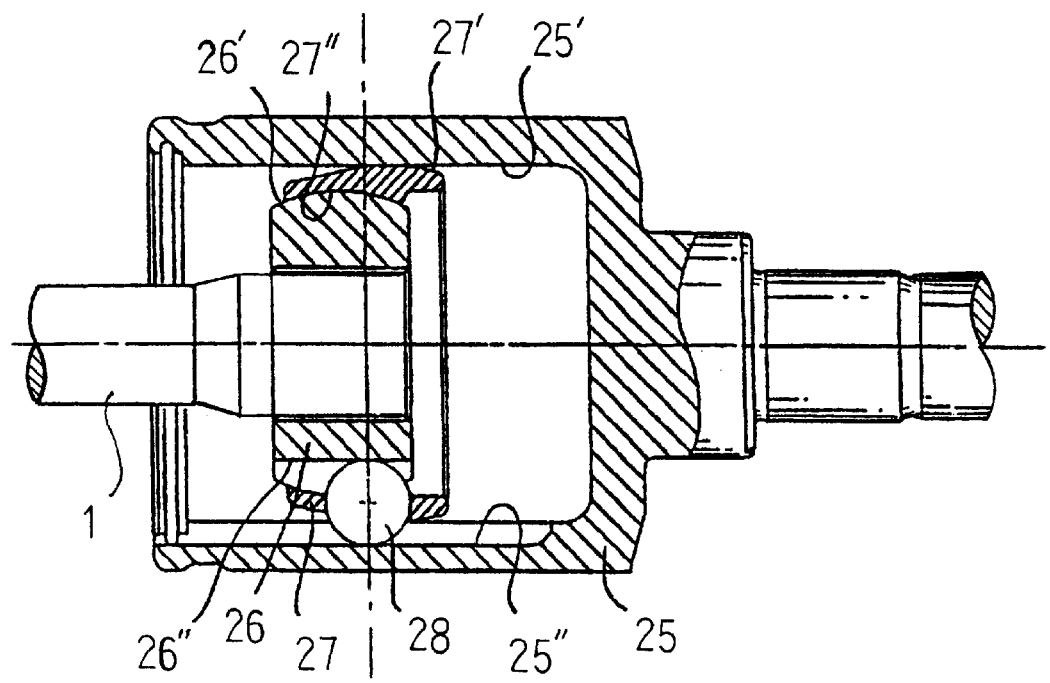
FIGS. 8A and 8B are a longitudinal sectional view and a cross sectional view of a slide type constant velocity joint, respectively.
Figure 8B:
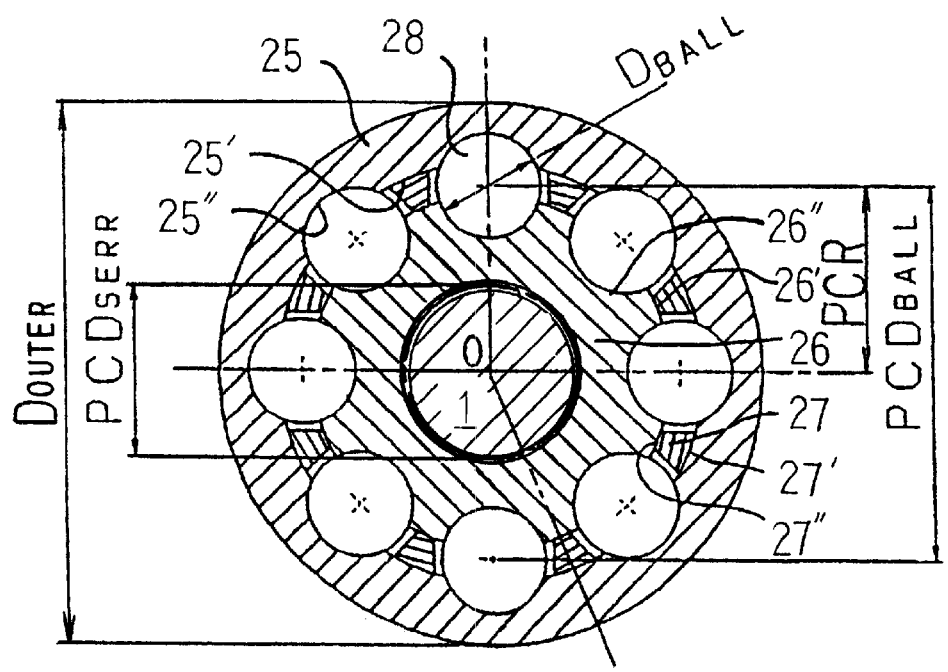

For a concrete example of the plunging type constant velocity joint for coupling the other end of the driving shaft 1 to the differential 3, the tripod type constant velocity joint 2 has been shown in FIGS. 2, 3, and 5. Alternatively, a double offset type constant velocity joint (DOJ) as shown in FIGS. 8(A) and 8(B) may be used here. The double offset type constant velocity joint comprises an outside joint member 25, an inside joint member 26, eight torque transmission balls 28, and a cage 27. The outside joint member 25 has a cylindrical inside surface 25' provided with eight linear guide grooves 25" formed axially. The inside joint member 26 has a spherical outside surface 26' provided with eight linear guide grooves 26" formed axially, and an inside surface provided with a serration or spline tooth profile. The eight torque transmission balls 28 are individually arranged in eight ball tracks which are formed by the pairs of the guide grooves 25" and 26" in the outside and inside joint members 25 and 26. The cage 27 retains the torque transmission balls 28. The other end of the driving shaft 1 is serration- or spline-connected to the inside joint member 26.

The spherical centers of an outside surface 27' and an inside surface 27" of the cage 27 have offsets from the pocket center of the cage 27 by equal axial distances in the opposite directions.

The ratio ($r_1=PCD_{BALL}/D_{BALL}$) between the pitch circle diameter ($PCD_{BALL}$) and the diameter ($D_{BALL}$) of the torque transmission balls 28 may be set within the range of $2.9 \leq r_1 \leq 4.5$, preferably $3.1 \leq r_1 \leq 4.5$, for the same reason as that for the rigid type constant velocity joint 14 described above. Here, the pitch circle diameter ($PCD_{BALL}$) of the torque transmission balls equals to the distance between the centers of two torque transmission balls situated in 180°-opposed ball tracks at an operating angle of 0°. In FIG. 8B, a dimension half the pitch circle diameter ($PCD_{BALL}$) is PCR ($PCD_{BALL}=2 \times PCR$).

The ratio $r_2$ between the outer diameter ($D_{OUTER}$) of the outside joint member 25 and the pitch circle diameter ($PCD_{SERR}$) of the serration or spline tooth profile of the inside joint member 26 is set within the range of $2.5 \leq r_2 \leq 3.5$, preferably $2.5 \leq r_2 < 3.1$, for the same reason as that for the rigid type constant velocity joint described before.

Like the fixed type constant velocity joint described before, this constant velocity joint has the eight torque transmission balls 28, and is lower in the proportion of a load per torque transmission ball to the total load capacity of the joint when compared with conventional rigid type constant velocity joints having six balls. Therefore, the torque transmission balls 28 can be reduced in diameter ($D_{BALL}$) to secure the thicknesses of the outside joint member 25 and the inside joint member 26 as in a six-balled rigid type constant velocity joint. Moreover, while the ratio $r_2$ ($=D_{OUTER}/PCD_{SERR}$) in a six-balled plunging type constant velocity joint typically has a value of $r_2 \geq 3.2$, this ratio $r_2$ can be lowered to secure equivalent or higher strength, load capacity, and durability as well as achieve further compactization in outer dimension ($D_{OUTER}$). Moreover, it has been confirmed from experiments that this constant velocity joint generates less heat as compared with a six-balled plunging type constant velocity joint. Incidentally, any plunging type constant velocity joint can offer the same effects as long as it has eight or more pairs of guide grooves 25" and 26".

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A driving wheel bearing unit comprising:
   a wheel bearing including
      an external member having an outer periphery provided with a mounting flange for car-body mounting and a fitting surface, and an inner periphery provided with two outer races, and
      an internal member rotatably arranged inside said external member via a rolling element, said internal member having an outer periphery provided with a race and a wheel mounting flange for mounting a wheel; and
   a constant velocity joint to be arranged on one end of a driving shaft, said constant velocity joint including
      an outside joint member having an inner periphery provided with eight guide grooves,
      an inside joint member having an outer periphery provided with eight guide grooves,
      eight torque transmission balls individually arranged in eight ball tracks formed by pairs of said guide grooves in said outside joint member and said guide grooves in said inside joint member,
      a cage for retaining said torque transmission balls, and
      a boot to be attached to said outside joint member;
   said wheel bearing and said outside joint member of said constant velocity joint being integrated with each other, wherein
      the diameter of said boot across its maximum diameter portion is equal to or smaller than the diameter of said external member across said fitting surface.

2. A driving wheel bearing unit comprising:
   a wheel bearing including
      an external member having an outer periphery provided with a mounting flange for car-body mounting and a fitting surface, and an inner periphery provided with two outer races, and
      an internal member rotatably arranged inside said external member via a rolling element, said internal member having an outer periphery provided with a race and a wheel mounting flange for mounting a wheel; and
   a constant velocity joint to be arranged on one end of a driving shaft, said constant velocity joint including
      an outside joint member having an inner periphery provided with eight guide grooves,
      an inside joint member having an outer periphery provided with eight guide grooves,
      eight torque transmission balls individually arranged in eight ball tracks formed by pairs of said guide grooves in said outside joint member and said guide grooves in said inside joint member,
      a cage for retaining said torque transmission balls, and
      a boot to be attached to said outside joint member;
   said wheel bearing and said outside joint member of said constant velocity joint being integrated with each other, wherein
      the diameter of said outside joint member across its maximum diameter portion is equal to or smaller than the diameter of said external member across said fitting surface.

3. The driving wheel bearing unit according to claim 1, wherein:
   said wheel bearing, said constant velocity joint to be arranged on the one end of said driving shaft, said driving shaft, and a constant velocity joint to be arranged on the other end of said driving shaft constitute a drive shaft assembly; and
   the maximum outer diameter of said drive shaft assembly is equal to or smaller than the diameter of said external member across said fitting surface.

4. The driving wheel bearing unit according to claim 1, wherein
   one of two inner races corresponding to said two outer races in said external member is arranged in the outer periphery of said internal member, and the other is arranged in the outer periphery of said outside joint member.

5. The driving wheel bearing unit according to claim 1, wherein
   said internal member of said wheel bearing and said outside joint member of said constant velocity joint are integrated with each other by caulking.

6. The driving wheel bearing unit according to claim 1, wherein another constant velocity joint to be arranged on the other end of said driving shaft comprises:
   an outside joint member having a cylindrical inside surface provided with eight linear guide grooves extending axially;
   an inside joint member having a spherical outside surface provided with eight linear guide grooves extending axially;
   eight torque transmission balls individually arranged in eight ball tracks formed by pairs of said guide grooves in said outside joint member and said guide grooves in said inside joint member; and
   a cage for retaining said torque transmission balls.

7. The driving wheel bearing unit according to claim 1, wherein
   said boot is made of resin material.

8. The driving wheel bearing unit according to claim 2, wherein:
   said wheel bearing, said constant velocity joint to be arranged on the one end of said driving shaft, said driving shaft, and a constant velocity joint to be arranged on the other end of said driving shaft constitute a drive shaft assembly; and
   the maximum outer diameter of said drive shaft assembly is equal to or smaller than the diameter of said external member across said fitting surface.

9. The driving wheel bearing unit according to claim 2, wherein
   one of two inner races corresponding to said two outer races in said external member is arranged in the outer periphery of said internal member, and the other is arranged in the outer periphery of said outside joint member.

10. The driving wheel bearing unit according to claim 2, wherein
    said internal member of said wheel bearing and said outside joint member of said constant velocity joint are integrated with each other by caulking.

11. The driving wheel bearing unit according to claim 2, wherein said constant velocity joint to be arranged on the other end of said driving shaft comprises:
    an outside joint member having a cylindrical inside surface provided with eight linear guide grooves extending axially;
    an inside joint member having a spherical outside surface provided with eight linear guide grooves extending axially;

eight torque transmission balls individually arranged in eight ball tracks formed by pairs of said guide grooves in said outside joint member and said guide grooves in said inside joint member; and a cage for retaining said torque transmission balls.

12. The driving wheel bearing unit according to claim 2, wherein said boot is made of resin material.

* * * * *